United States Patent
Reichhardt

(10) Patent No.: US 7,430,815 B2
(45) Date of Patent: Oct. 7, 2008

(54) ELECTROMECHANICAL SENSING DEVICE FOR DETECTING DISTANCE

(76) Inventor: Andreas Reichhardt, Hofgut Ringelshausen, D-34510 Hungen (DE)

( * ) Notice: Subject to any disclaimer, the term of this patent is extended or adjusted under 35 U.S.C. 154(b) by 0 days.

(21) Appl. No.: 11/491,595

(22) Filed: Jul. 24, 2006

(65) Prior Publication Data
US 2007/0294906 A1 Dec. 27, 2007

(30) Foreign Application Priority Data
Jun. 23, 2006 (DE) .................. 10 2006 029 290

(51) Int. Cl.
*G01B 3/32* (2006.01)
(52) U.S. Cl. .................. 33/832; 33/521; 56/10.2 D
(58) Field of Classification Search .................. 33/521, 33/708, 832, 833; 172/233, 234, 682; 56/10.2 D, 56/10.2 F
See application file for complete search history.

(56) References Cited

U.S. PATENT DOCUMENTS

| 3,875,671 | A | * | 4/1975 | Vetter ........................... 33/832 |
| 4,166,349 | A | | 9/1979 | Coenenberg et al. |
| 5,185,990 | A | * | 2/1993 | Barnes et al. .............. 56/10.2 F |
| 6,338,202 | B1 | * | 1/2002 | Brunner ........................ 33/832 |
| 6,357,134 | B1 | * | 3/2002 | Hama et al. .................... 33/832 |
| 6,647,636 | B2 | * | 11/2003 | Fukuhara et al. .............. 33/521 |
| 2005/0229420 | A1 | * | 10/2005 | Brenner et al. ................ 33/558 |
| 2006/0130347 | A1 | * | 6/2006 | Bergamasco et al. .......... 33/512 |

FOREIGN PATENT DOCUMENTS

| AT | 26 41 181 B | 8/1968 |
| DE | 23 62 899 C2 | 6/1975 |
| DE | 27 05 491 C2 | 11/1978 |
| DE | 44 12 557 A1 | 10/1995 |
| GB | 1 489 210 | 10/1977 |

* cited by examiner

*Primary Examiner*—G. Bradley Bennett
(74) *Attorney, Agent, or Firm*—Collard & Roe, P.C.

(57) ABSTRACT

In a sensing device for detecting the distance of a vehicle or work device from structures that can be sensed mechanically, in particular plant stands, plant rows, soil structures, ploughing furrows or the like, with a rod-shaped, resilient sensing feeler which has a freely movable sensing end and at a distance therefrom is fixed rigidly to a housing, and an electrical measuring system which detects a change in location of the sensing end in respect of the holder and generates a measuring signal dependent on the change in location, the sensing feeler has at a distance from its fixing location a permanent magnet whose magnetic field is detected by a field-sensitive sensor with a fixed location in respect of the fixing location of the sensing feeler, which sensor generates an electrical signal dependent on the distance between the permanent magnet and the sensor.

11 Claims, 1 Drawing Sheet

ELECTROMECHANICAL SENSING DEVICE FOR DETECTING DISTANCE

CROSS-REFERENCE TO RELATED APPLICATIONS

This application claims the benefit of German Patent Application No. 10 2006 029 290.1, filed on Jun. 23, 2006. The disclosure of the above application is incorporated herein by reference.

TECHNICAL FIELD

The invention relates to a sensing device for detecting the distance of a vehicle or work device from structures that can be sensed mechanically, in particular plant stands, plant rows, soil structures, ploughing furrows or the like, with a rod-shaped, resilient sensing feeler, which has one freely movable sensing end and is fixed rigidly to a holder at a distance from said sensing end, and an electrical measuring system which detects a change in location of the sensing end in relation to the holder and generates a measuring signal dependent on the change in location.

BACKGROUND

Sensing devices of the mentioned kind are used to guide agricultural machines, tractors, work devices or construction machines automatically along a structure that can be sensed, for example a plant row, a stand boundary or a soil furrow. The signal from the sensing device can serve in the automatic steering of a vehicle or of a self-driving machine and it can be used to control the working position of a farming implement horizontally or vertically.

A sensing device of the mentioned kind is known from DE 23 62 899 C2 whose sensing signal acts in the automatic lateral guidance of a self-driving agricultural harvesting machine. The sensing feelers are fixed to a support arm which projects forwards in the driving direction over the cutting mechanism of the harvesting machine such that they extend backwards in a flat circular arc. Close to the fixing location there are strain gauge circuits seated at the sensing feelers, which convert the deflection of the sensing feelers into an electrical signal. The mechanical bending stress of the sensing feelers elicited by the impacting harvested material is thus converted into an electrical signal for controlling the machine. This known design has the disadvantage that it is complex and susceptible to breakdown. The strain gauges are very sensitive and have to be protected in complex manner from the wrong mechanical stress, especially since they are arranged on the unfavorable impact side of the sensing feelers. The same applies to the connection lines which connect the gauges to the analysis circuit and have to be laid within a protective tube. Each time there is damage to the sensing feelers, an expensive element of the measuring system has to be replaced.

From DE 27 05 491 C2 a sensing device for automatic lateral guidance of a self-driving harvesting machine along a plant row is further known wherein a curved sensing feeler on the machine is mounted rotatably around an approximately vertical axis. The rotatable mounting is located within a divider tip of the machine closed with a casing and is equipped with an electrical measuring system which forms a control signal dependent on the angle of rotation of the hub element carrying the sensing feeler. This sensing device is also complex and its installation requires a protective casing.

SUMMARY

The object of the invention is to create a robust and malfunction-free sensing device of the initially mentioned kind which is versatile in use and is distinguished by a simple construction.

This object of the invention is achieved by the features cited in claim 1. Advantageous developments of the invention are cited in the other claims.

In the sensing device according to the invention, the sensing feeler has a permanent magnet at a distance from its fixing location whose magnetic field is detected by a field-sensitive sensor which is rigidly located in respect of the fixing location of the sensing feeler, said sensor generating an electrical signal dependent on the distance between the permanent magnet and the sensor.

In the solution according to the invention, the sensing feeler is a simple, uncomplicated and non-sensitive component which can be produced inexpensively. No sensitive measuring organs are attached to the sensing feeler which is exposed to stronger stress and wear through contact with the structures to be sensed. Instead the sensing feeler only carries a permanent magnet which is very insensitive to mechanical stress and dirt and which does not require connection via lines to a circuit. Preferably the permanent magnet is arranged in a recess of the sensing feeler and by this means is additionally protected against external influences. If the sensing feeler is worn or damaged, it can easily be replaced by undoing its fastening without further parts of the electrical measuring system being affected thereby. The sensor is separate from the sensing feeler and is arranged directly behind it in the sensing direction and is therefore protected by the sensing feeler. Preferably the sensor, together with the associated sensor electronics, is completely encapsulated in a housing comprising non-magnetic material and is thereby reliably protected from external influences. A Hall sensor is preferably provided as a sensor to generate a voltage signal dependent on the field strength of the magnetic field.

According to the invention, the sensing feeler can be provided as a straight rod and can consist of a highly resilient material, for example fiber-reinforced plastics material. Provision can also be made for the cross-section of the sensing feeler to taper from the fixing location in the direction of the sensing end. Uniform distribution of the bending stress and favorable deformation characteristics are achieved by this means. The cross-sectional profile of the sensing feeler can furthermore be designed such that the sensing feeler has a smaller bending resistance in the sensing direction than transversely to the sensing direction.

A further proposal of the invention provides for the sensing feeler being symmetrical in relation to its fixing location so that from its fixing location outwards the sensing feeler extends in two opposing directions and has two opposing sensing ends. By means of such a design it is possible to sense two structures at a distance from one other simultaneously, for example plant rows, and to guide a device along the middle between the plant rows. It is equally possible to sense sometimes with the left and sometimes with the right sensing end.

According to a further proposal of the invention, the sensing feeler with the rear side facing away from the structures that can be sensed can be abutted against an, in particular concave, support surface of a support element, the distance between the sensing feeler and the support surface steadily increasing from the fixing location in the direction of the sensing end. In this development as the deformation increases, the sensing feeler increasingly lies on the support surface, its free length being reduced correspondingly. By this means the bending stress of the sensing feeler is reduced in the case of stronger deflection while excess stress at the fixing location is avoided. Simultaneously a controlled deformation of the region of the sensing feeler determining the change in location of the permanent magnet is achieved. Preferably the support element is part of a housing which encompasses the sensor and the electronic sensor circuit.

BRIEF DESCRIPTION OF THE DRAWINGS

The invention is explained in more detail hereinafter by reference to an embodiment shown in the drawings, in which.

DETAILED DESCRIPTION

Figure 1:
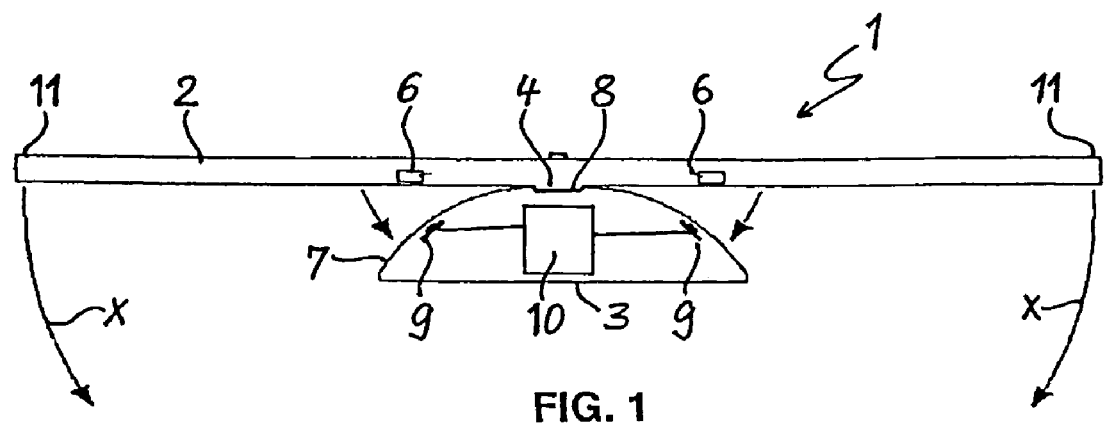
FIG. 1 shows a sensing device according to the invention viewed from above.
Figure 2:
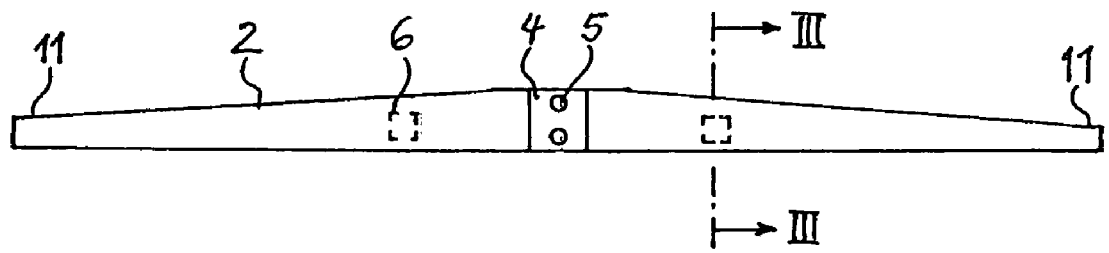
FIG. 2 shows a view of the sensing feeler of the sensing device according to FIG. 1 viewed in the sensing direction.
Figure 3:
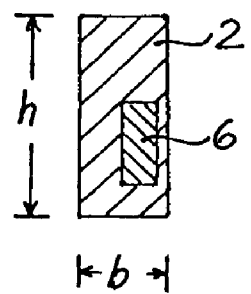
FIG. 3 shows a cross-section along the line III-III of the sensing feeler in FIG. 2.

The sensing device 1 shown in the drawings has a sensing feeler 2 and a housing 3 to which the sensing feeler 2 is detachably fixed. The sensing feeler 2 has the shape of a substantially straight rod of rectangular cross-section. The width b of the cross-section is constant, its height h is greater than the width b and tapers uniformly from the rod mid-point in the direction of the two rod ends. The sensing feeler 2 is therefore stiffer in the direction of its height h than in the direction of its width b which is the sensing direction. The sensing feeler 2 is provided in the middle of a wide side with a rectangular projection 4 and bores 5 which penetrate the sensing feeler 2 in the region of the projection 4 and serve to accommodate fixing screws. Permanent magnets 6 are embedded in the sensing feeler 2 on both sides of the projection 4 and at the same distance from it respectively. The permanent magnets 6 are surrounded on all sides by the material of the sensing feeler 2 and by that means are protected against external influences.

The sensing feeler 2 consists of glass-fiber reinforced plastics material and has high flexibility. In the production of the sensing feeler 2, the permanent magnets 6 can be cast round with the plastics material. Alternatively, the sensing feeler can be provided with apertures which are closed after inserting the permanent magnets. Instead of glass-fiber reinforced plastics material, other non-magnetic materials with high resilience, for example stainless steel, can also be used to produce the sensing feeler 2.

The housing 3 forms on its outer side facing the sensing feeler 2 a substantially cylindrical support surface 7 in the middle of which is a recess 8 for receiving the projection 4. The outer surface of the housing 3 opposing the cylindrical support surface 7 is flat and is suitable for attaching the housing 3 to a holder. In the housing 3 in a symmetrical arrangement close to the support surface 7 there are two Hall sensors 9 and an electronic circuit 10 to which the Hall sensors are connected, which serves to provide power to the sensors and for signal processing and signal amplification. In a magnetic field, Hall sensors generate a voltage signal which is dependent on the field strength. Through an interface (not shown), the circuit 10 can be connected to an electric control device of a vehicle or of a work machine. The housing 3 consists of non-magnetic material, so that the magnetic fields of the permanent magnets 6 are not disturbed or weakened by the housing.

As can be seen from FIG. 1, the permanent magnets 6 are arranged in regions of the sensing feeler 2 which come close to the support surfaces 7 when the sensing ends 11 of the sensing feeler 2 are bent in the direction of the arrows X. The sensors 9 are located on the inner side of the housing wall forming the support surface 7 respectively at a location, which is substantially located on an extension of the curve of the path on which the permanent magnets 6 move when bending the sensing ends 11. The Hall sensors 9 thus detect each displacement of the magnetic field of the permanent magnets 6 caused by the bending of the sensing ends 11 in the direction of the arrow and generate an analog signal dependent on the respective field strength, and thus on the extent of the displacement of the permanent magnets 6, which signal describes the strength of the deflection of the sensing ends 11 in the direction of the arrow. The signal gained thereby thus indicates how strongly a sensing end 11 is deflected out of its basic position by a sensed structure and accordingly how great the distance of the sensing device 1 is from the sensed structure.

In the practical application of the sensing device 1 the housing 3 is connected to a vehicle or farming implement which is to be controlled such that the sensing feeler 2 lies forwards in the driving direction. Also there is an electrical connection between the sensors 9 or electronic circuit 10 and the electrical control of the vehicle. If the sensing device 1 is attached such that the sensing feeler 2 extends horizontally transversely to the driving direction, and the housing 3 lies in the middle of the vehicle, the deflection of both sensing ends 11 of the sensing feeler 2 can be used for guiding the vehicle, for example in the middle between two stand rows or between two earth banks in the case of an arrangement of the sensing device 1 close to the soil. The vehicle is controlled by the analysis and control unit during this such that the deflection of the sensing feeler 2 at both sensing ends 11 remains uniform. If the sensing device 1 is attached such that the sensing feeler 2 is oriented vertically, the downward pointing sensing end can be used to guide a unit of the vehicle or of the farming implement at a height or depth. During this, the analysis and control unit guides the corresponding device such that the deflection of the sensing feeler 2 always corresponds to a predetermined target value.

The described sensing device has the advantage that it is very robust in respect of mechanical stress. The sensing feeler can be deflected, compressed or twisted in all directions without being damaged. The sensing device is extremely versatile in application, it can be used vertically, horizontally or else in other orientations. The sensing feeler can be of various shapes and sizes in order to achieve the optimal adjustment for particular applications without requiring a change in the measuring system or the sensors. Also it is possible to replace the sensing feeler simply and without interfering in the electrical portion of the measuring system.

What is claimed is:

1. Sensing device for detecting the distance of a vehicle or work device from structures that can be sensed mechanically, with a rod-shaped, resilient sensing feeler, which has a freely movable sensing end and at a distance from it is fixed rigidly to a holder, and an electrical measuring system, which detects a change in location of the sensing end in relation to the holder and generates a measuring signal dependent on the change in location wherein the sensing feeler has at a distance from its fixing location a permanent magnet whose magnetic field is detected by a field-sensitive sensor which is at a fixed location in respect of the fixing location of the sensing feeler, which sensor generates an electrical signal dependent on the distance between the permanent magnet and the sensor.

2. Sensing device according to claim 1 wherein the permanent magnet is disposed depressed in a recess of the sensing feeler.

3. Sensing device according to claim 1 wherein the sensor is separated from the sensing feeler and is arranged in the sensing direction behind it.

4. Sensing device according to claim 1 wherein the sensor together with the associated electronic circuit is completely encapsulated in a housing comprising non-magnetic material.

5. Sensing device according to claim 1 wherein the sensor is a Hall sensor which generates a voltage signal dependent on the field strength of the magnetic field.

6. Sensing device according to claim 1 wherein the sensing feeler is provided as a straight rod and comprises a fiber-reinforced plastics material.

7. Sensing device according to claim 1 wherein the cross-section of the sensing feeler tapers from the fixing location in the direction of the sensing end.

8. Sensing device according to claim 1 wherein the sensing feeler has a smaller bending resistance in the sensing direction than transversely to the sensing direction.

9. Sensing device according to claim 1 wherein the sensing feeler is symmetrical in relation to its fixing location.

10. Sensing device according to claim 1 wherein the sensing feeler can abut against a convex, support surface of a support element, with the rear side facing away from the structures that can be sensed, the distance between the sensing feeler and the support surface steadily increasing from the fixing location in the direction of the sensing end.

11. Sensing device according to claim 4 wherein the support element forms part of the housing which encompasses the sensor and the electronic sensor circuit.

* * * * *